(12) United States Patent
Abotabl et al.

(10) Patent No.: US 12,191,944 B2
(45) Date of Patent: Jan. 7, 2025

(54) SUB-BAND PRECODING FOR INTER USER EQUIPMENT INTERFERENCE MITIGATION

(71) Applicant: QUALCOMM Incorporated, San Diego, CA (US)

(72) Inventors: Ahmed Attia Abotabl, San Diego, CA (US); Muhammad Sayed Khairy Abdelghaffar, San Jose, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 432 days.

(21) Appl. No.: 17/643,126

(22) Filed: Dec. 7, 2021

(65) Prior Publication Data

US 2023/0179271 A1 Jun. 8, 2023

(51) Int. Cl.
*H04L 5/12* (2006.01)
*H04B 7/0456* (2017.01)
*H04W 72/044* (2023.01)
*H04W 72/21* (2023.01)

(52) U.S. Cl.
CPC ...... *H04B 7/0456* (2013.01); *H04W 72/0466* (2013.01); *H04W 72/21* (2023.01)

(58) Field of Classification Search
CPC ............... H04B 7/0456; H04B 7/0689; H04W 72/0466; H04W 72/21; H04W 72/1268; H04L 5/0023; H04L 5/0094; H04L 5/0044

USPC ......................................................... 375/262
See application file for complete search history.

(56) References Cited

U.S. PATENT DOCUMENTS

| | | | |
|---|---|---|---|
| 11,317,306 B2 * | 4/2022 | Wei ..................... | H04B 7/0647 |
| 2012/0082102 A1 * | 4/2012 | Kang ................... | H04B 7/0639 370/329 |
| 2020/0044801 A1 * | 2/2020 | Wang ................... | H04L 5/0094 |
| 2021/0126681 A1 * | 4/2021 | Huang ................. | H04B 7/0404 |
| 2022/0131663 A1 * | 4/2022 | Huang ................. | H04W 72/27 |
| 2022/0330224 A1 * | 10/2022 | Ruder .................. | H04W 4/021 |

FOREIGN PATENT DOCUMENTS

EP 2930994 * 4/2014

* cited by examiner

*Primary Examiner* — Helene E Tayong
(74) *Attorney, Agent, or Firm* — QUALCOMM Incorporated

(57) ABSTRACT

Various aspects of the present disclosure generally relate to wireless communication. In some aspects, a user equipment (UE) may obtain a configuration that indicates to use a first type of precoding or a second type of precoding, for an uplink communication, based at least in part on one or more frequency resources for a downlink communication. The UE may perform a transmission of the uplink communication, having the first type of precoding or the second type of precoding, in accordance with the configuration. Numerous other aspects are described.

26 Claims, 10 Drawing Sheets

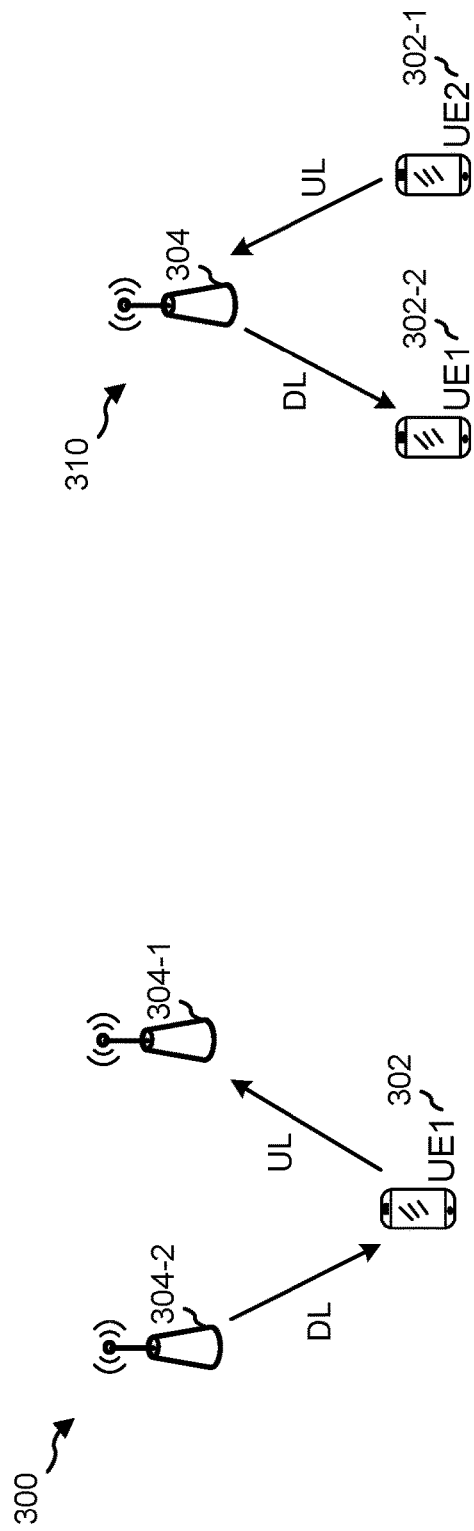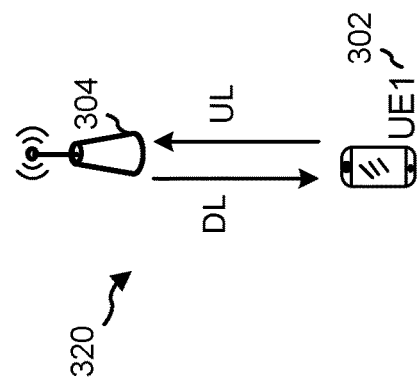
FIG. 3B
FIG. 3C
FIG. 3A

SUB-BAND PRECODING FOR INTER USER EQUIPMENT INTERFERENCE MITIGATION

FIELD OF THE DISCLOSURE

Aspects of the present disclosure generally relate to wireless communication and to techniques and apparatuses for sub-band precoding for inter user-equipment interference mitigation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 3A, 3B and 3C are diagrams illustrating examples of full-duplex communication, in accordance with the present disclosure.

SUMMARY

Figure 1:
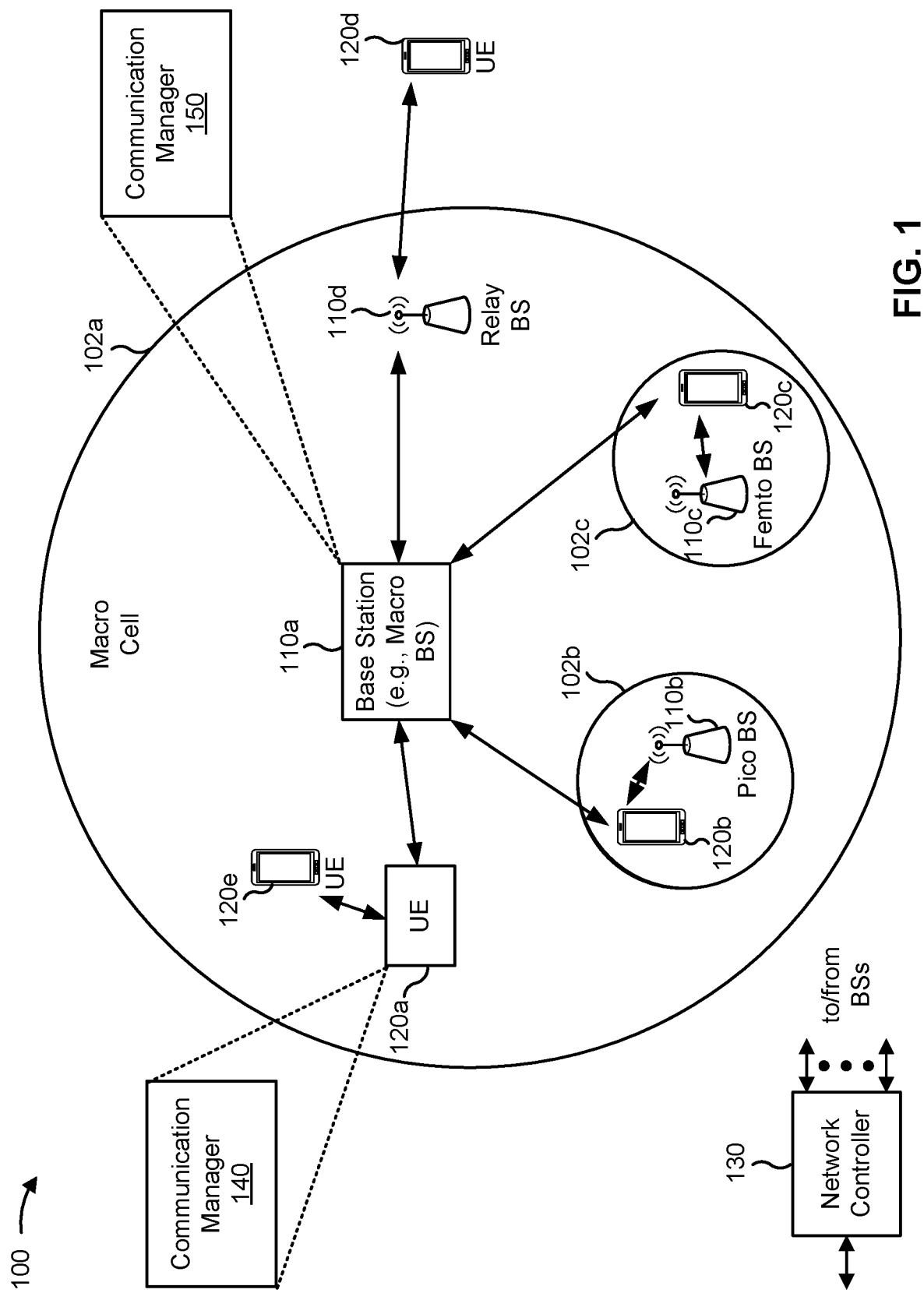
FIG. 1 is a diagram illustrating an example of a wireless network, in accordance with the present disclosure.

Some aspects described herein relate to a method of wireless communication performed by a user equipment (UE). The method may include obtaining a configuration that indicates to use a first type of precoding or a second type of precoding, for an uplink communication, based at least in part on one or more frequency resources for a downlink communication. The method may include performing a transmission of the uplink communication, having the first type of precoding or the second type of precoding, in accordance with the configuration.

Some aspects described herein relate to a method of wireless communication performed by a base station. The method may include transmitting, to a UE, a configuration that indicates to use a first type of precoding or a second type of precoding, for an uplink communication, based at least in part on one or more frequency resources for a downlink communication. The method may include receiving, from the UE, a transmission of the uplink communication having the first type of precoding or the second type of precoding.

Some aspects described herein relate to an apparatus for wireless communication performed by a UE. The apparatus may include a memory and one or more processors, coupled to the memory. The one or more processors may be configured to obtain a configuration that indicates to use a first type of precoding or a second type of precoding, for an uplink communication, based at least in part on one or more frequency resources for a downlink communication. The one or more processors may be configured to perform a transmission of the uplink communication, having the first type of precoding or the second type of precoding, in accordance with the configuration.

Some aspects described herein relate to an apparatus for wireless communication performed by a base station. The apparatus may include a memory and one or more processors, coupled to the memory. The one or more processors may be configured to transmit, to a UE, a configuration that indicates to use a first type of precoding or a second type of precoding, for an uplink communication, based at least in part on one or more frequency resources for a downlink communication. The one or more processors may be configured to receive, from the UE, a transmission of the uplink communication having the first type of precoding or the second type of precoding.

Some aspects described herein relate to a non-transitory computer-readable medium that stores a set of instructions for wireless communication by a UE. The set of instructions, when executed by one or more processors of the UE, may cause the UE to obtain a configuration that indicates to use a first type of precoding or a second type of precoding, for an uplink communication, based at least in part on one or more frequency resources for a downlink communication. The set of instructions, when executed by one or more processors of the UE, may cause the UE to perform a transmission of the uplink communication, having the first type of precoding or the second type of precoding, in accordance with the configuration.

Some aspects described herein relate to a non-transitory computer-readable medium that stores a set of instructions for wireless communication by a base station. The set of instructions, when executed by one or more processors of the base station, may cause the base station to transmit, to a UE, a configuration that indicates to use a first type of precoding or a second type of precoding, for an uplink communication, based at least in part on one or more frequency resources for a downlink communication. The set of instructions, when executed by one or more processors of the base station, may cause the base station to receive, from the UE, a transmission of the uplink communication having the first type of precoding or the second type of precoding.

Some aspects described herein relate to an apparatus for wireless communication. The apparatus may include means for obtaining a configuration that indicates to use a first type of precoding or a second type of precoding, for an uplink communication, based at least in part on one or more frequency resources for a downlink communication. The apparatus may include means for performing a transmission of the uplink communication, having the first type of precoding or the second type of precoding, in accordance with the configuration.

Some aspects described herein relate to an apparatus for wireless communication. The apparatus may include means for transmitting, to a UE, a configuration that indicates to use a first type of precoding or a second type of precoding, for an uplink communication, based at least in part on one or more frequency resources for a downlink communication. The apparatus may include means for receiving, from the UE, a transmission of the uplink communication having the first type of precoding or the second type of precoding.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support an RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may obtain a configuration that indicates to use a first type of precoding or a second type of precoding, for an uplink communication, based at least in part on one or more frequency resources for a downlink communication; and perform a transmission of the uplink communication, having the first type of precoding or the second type of precoding, in accordance with the configuration. Additionally, or alternatively, the communication manager 140 may perform one or more other operations described herein.

In some aspects, the base station 110 may include a communication manager 150. As described in more detail elsewhere herein, the communication manager 150 may transmit, to a UE, a configuration that indicates to use a first type of precoding or a second type of precoding, for an uplink communication, based at least in part on one or more frequency resources for a downlink communication; and receive, from the UE, a transmission of the uplink communication having the first type of precoding or the second type of precoding. Additionally, or alternatively, the communication manager 150 may perform one or more other operations described herein.

As indicated above, FIG. 1 is provided as an example. Other examples may differ from what is described with regard to FIG. 1.

Figure 2:
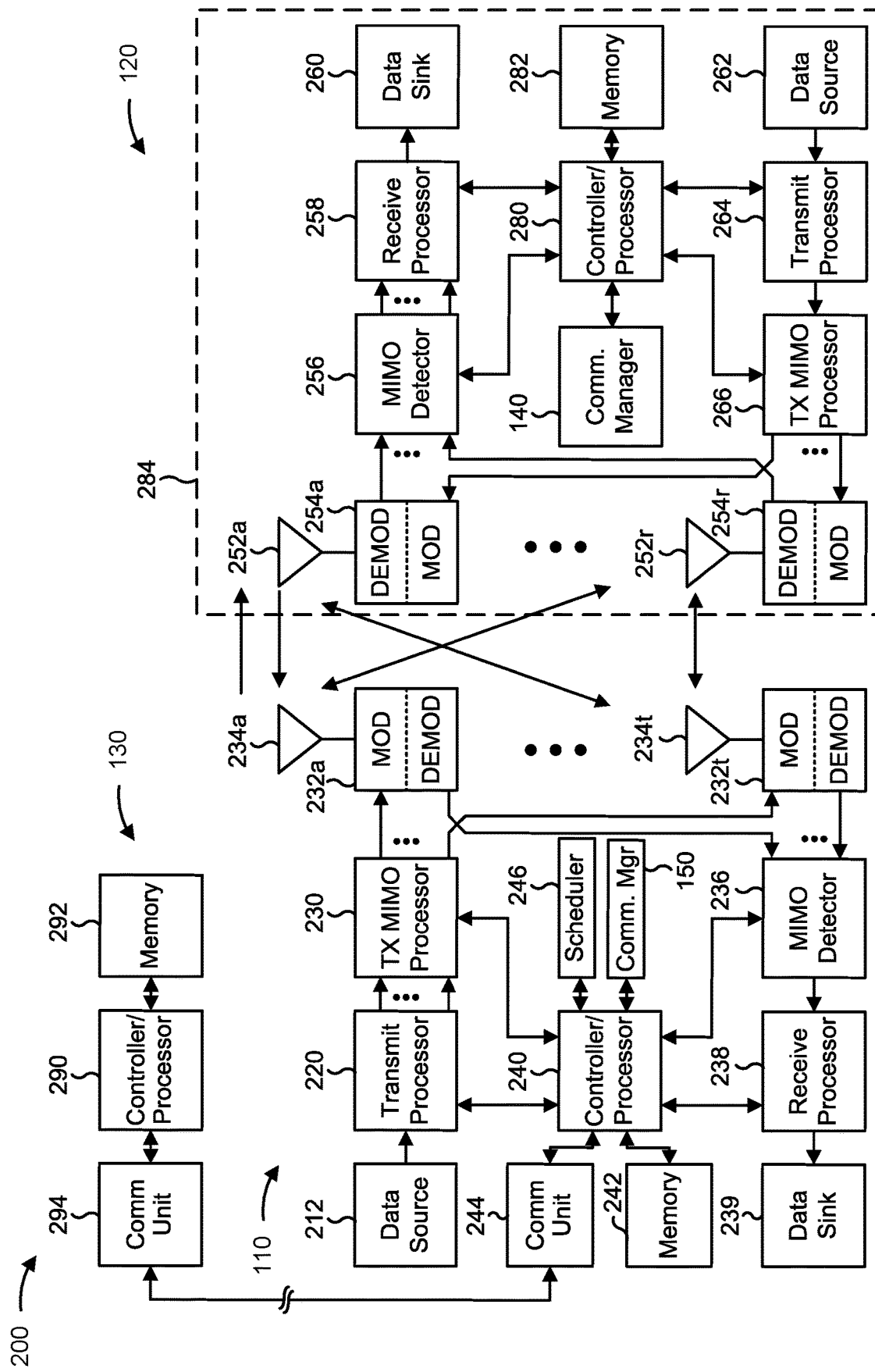
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-10).

The controller/processor 240 of the base station 110, the controller/processor 280 of the UE 120, and/or any other component(s) of FIG. 2 may perform one or more techniques associated with sub-band precoding for inter UE interference mitigation, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE includes means for obtaining a configuration that indicates to use a first type of precoding or a second type of precoding, for an uplink communication, based at least in part on one or more frequency resources for a downlink communication; and/or means for performing a transmission of the uplink communication, having the first type of precoding or the second type of precoding, in accordance with the configuration. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for transmitting, to a UE, a configuration that indicates to use a first type of precoding or a second type of precoding, for an uplink communication, based at least in part on one or more frequency resources for a downlink communication; and/or means for receiving, from the UE, a transmission of the uplink communication having the first type of precoding or the second type of precoding. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

FIGS. 3A-3C are diagrams illustrating examples 300, 310, 320 of full-duplex (FD) communication, in accordance with the present disclosure. The example 300 of FIG. 3A includes a UE1 302 and two base stations (e.g., TRPs) 304-1, 304-2, where the UE1 302 is sending UL transmissions to base station 304-1 and is receiving DL transmissions from base station 304-2. In the example 300 of FIG. 3A, FD is enabled for the UE1 302, but not for the base stations 304-1, 304-2. The example 310 of FIG. 3B includes two UEs, shown as UE1 302-1 and UE2 302-2, and a base station 304, where the UE1 302-1 is transmitting an UL communication to the base station 304 and the UE2 302-2 is receiving a DL communication from the base station 304. In the example 310 of FIG. 3B, FD is enabled for the base station 304, but not for UE1 302-1 and UE2 302-2. The example 320 of FIG. 3C includes a UE1 302 and a base station 304, where the UE1 302 is receiving a DL transmission from the base station 304 and the UE1 302 is transmitting an UL transmission to the base station 304. In the example 320 of FIG. 3C, FD is enabled for both the UE1 302 and the base station 304. Some techniques and apparatuses described herein improve full-duplex communication, such as by increasing throughput and increasing network resource utilization.

As indicated above, FIGS. 3A-3C are provided as one or more examples. Other examples may differ from what is described with regard to FIGS. 3A-3C.

Figure 4:
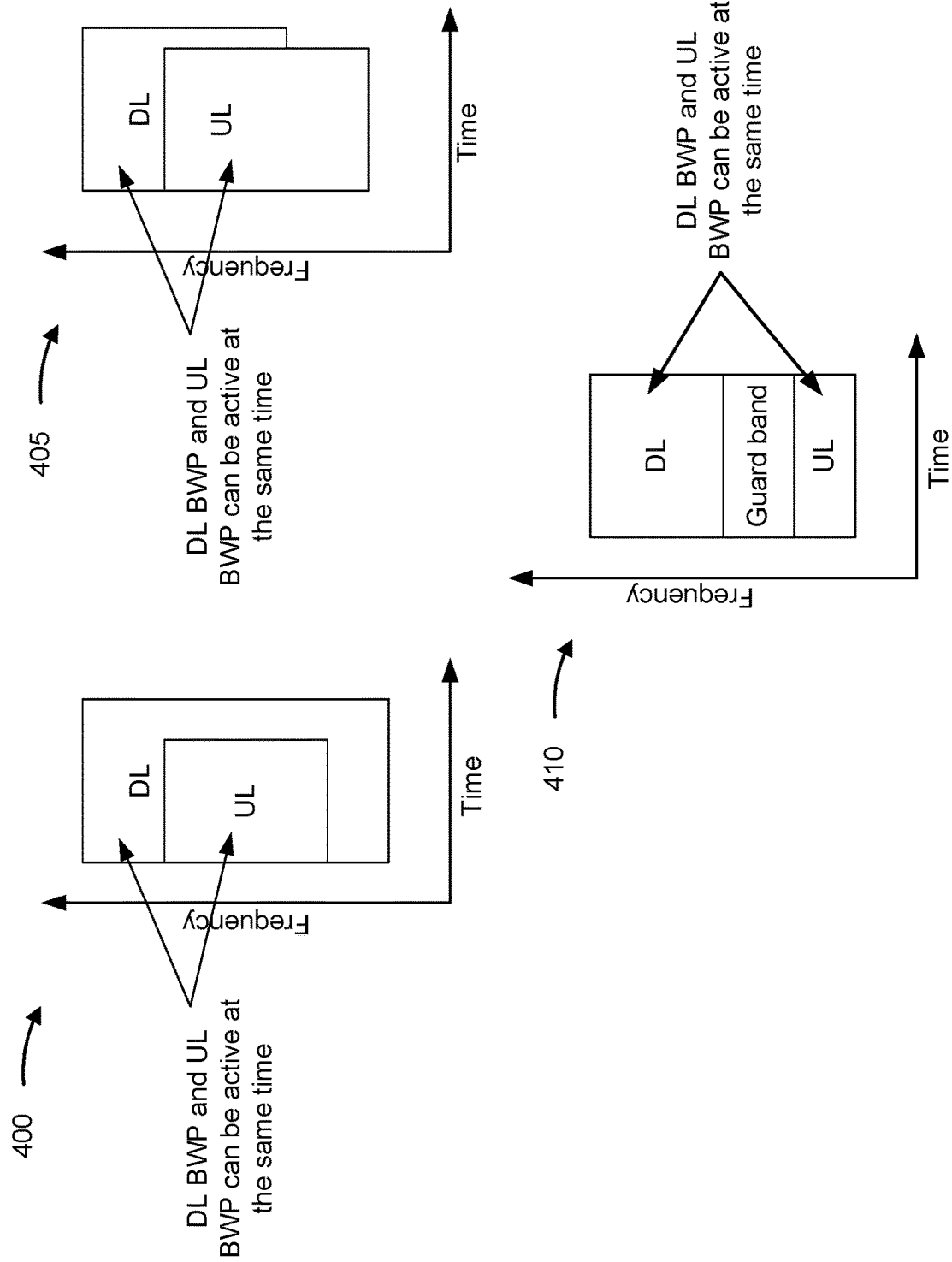
FIG. 4 is a diagram illustrating an example of full-duplex communication in a wireless network, in accordance with the present disclosure.

FIG. 4 is a diagram illustrating examples 400, 405, and 410 of full-duplex communication in a wireless network, in accordance with the present disclosure. "Full-duplex communication" in a wireless network refers to simultaneous bi-directional communication between devices in the wireless network. For example, a UE operating in a full-duplex mode may transmit an uplink communication and receive a downlink communication at the same time (e.g., in the same slot or the same symbol). "Half-duplex communication" in a wireless network refers to unidirectional communications (e.g., only downlink communication or only uplink communication) between devices at a given time (e.g., in a given slot or a given symbol).

As shown in FIG. 4, examples 400 and 405 show examples of in-band full-duplex (IBFD) communication. In IBFD, a UE may transmit an uplink communication to a base station and receive a downlink communication from the base station on the same time and frequency resources. As shown in example 400, in a first example of IBFD, the time and frequency resources for uplink communication may fully overlap with the time and frequency resources for downlink communication. As shown in example 405, in a second example of IBFD, the time and frequency resources for uplink communication may partially overlap with the time and frequency resources for downlink communication.

As further shown in FIG. 4, example 410 shows an example of sub-band full-duplex (SBFD) communication, which may also be referred to as "sub-band frequency division duplex (SBFDD)" or "flexible duplex." In SBFD, a UE may transmit an uplink communication to a base station and receive a downlink communication from the base station at the same time, but on different frequency resources. For example, the different frequency resources may be sub-bands of a frequency band, such as a time division duplexing band. In this case, the frequency resources used for downlink communication may be separated from the frequency resources used for uplink communication, in the frequency domain, by a guard band.

In some cases, sub-band precoding may involve using a different precoder for certain sets of resource blocks. This may be useful in the setting of a full-duplex operation, where certain sub-bands may cause more inter-UE interference than other bands. In some cases, the UE may be configured with two transmission configuration indicator (TCI) states based at least in part on the uplink communication channel (for the UE) and the downlink communication channel (for another UE). The UE may be configured to select the TCI state and the associated precoder for the sub-bands on the edges, thereby reducing the interference at the other UE. In some cases, the UE may be configured to use a precoder that maximizes the signal to interference plus noise ratio (SINR) at the base station. However, in some cases, the UE may need to use a different precoder in order to minimize the interference to the other UE.

In some cases, a first set of frequency resources may be allocated for uplink communications (e.g., communications from the first UE 302-1 to the base station 304), and a second set of frequency resources may be allocated for downlink communications (e.g., communications from the base station 304 to the second UE 302-2). The first set of frequency resources may be adjacent (e.g., in the frequency domain) to the second set of frequency resources. In some cases, an uplink communication by the first UE 302-1 to the base station 304, using the first set of frequency resources, may interfere with a downlink communication from the base station 304 to the second UE 302-2, using the second set of frequency resources. For example, the interference may be caused by a leakage of the uplink communication in into the frequency resources allocated for the downlink communication. Thus, uplink communications from a first UE may interfere with downlink communications to a second UE when the resources for the uplink communication are close (e.g., in the frequency domain) to the resources for the downlink communication. This is particularly true when the first UE is located physically close to the second UE.

Techniques and apparatuses are described herein for sub-band precoding for inter UE interference mitigation. In some aspects, a UE may obtain a configuration that indicates to use a first type of precoding or a second type of precoding, for an uplink communication, based at least in part on one or more frequency resources for a downlink communication (e.g., by a second UE). For example, the configuration may indicate to use the first type of precoding if the uplink communication is less than a threshold distance, or less than or equal to the threshold distance, from the one or more frequency resources for the downlink communication. Alternatively, the configuration may indicate to use the second type of precoding if the uplink communication is greater than the threshold distance, or greater than or equal to the threshold distance, from the one or more frequency resources for the downlink communication. The UE may perform a transmission of the uplink communication, having the first type of precoding or the second type of precoding, based at least in part on the distance of the one or more frequency resources for the uplink communication from the one or more frequency resources for the downlink communication.

As described above, an uplink communication by the first UE to the base station, using the first set of frequency resources, may interfere with a downlink communication from the base station to the second UE, using the second set of frequency resources. For example, the interference may be caused by leakage of the uplink communication into the frequency resources allocated for the downlink communication. The techniques and apparatuses described herein enable a first type of precoding for an uplink communication that uses frequency resources that are within a distance of the frequency resources for the downlink communication, and a second type of precoding for an uplink communication that uses frequency resources that are outside of the distance of the frequency resources for the downlink communication. In some aspects, the first type of precoding may be a narrowband precoding, and the second type of processing may be a wideband precoding. Interference between the uplink communication, from the first UE to the base station, and the downlink communication, from the base station to the second UE, may therefore be reduced or eliminated.

As indicated above, FIG. 4 is provided as an example. Other examples may differ from what is described with respect to FIG. 4.

Figure 5:
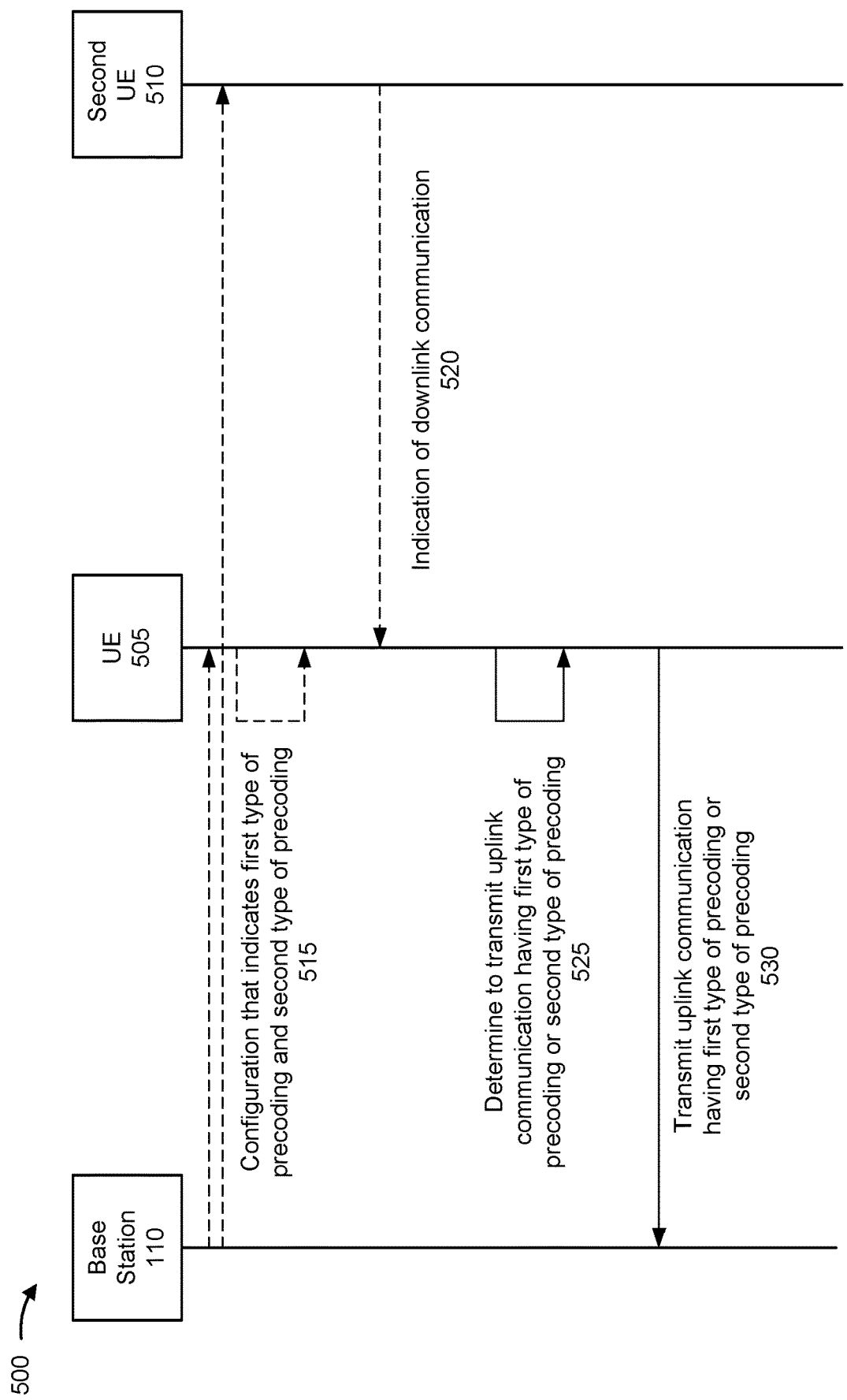
FIG. 5 is a diagram illustrating an example associated with sub-band precoding for inter UE interference mitigation, in accordance with the present disclosure.

FIG. 5 is a diagram illustrating an example 500 of sub-band precoding for inter UE interference mitigation, in accordance with the present disclosure. A UE, such as the UE 505, may communicate with a base station, such as the base station 110. The UE 505 may include some or all of the features of the UE 120 and/or the first UE 302-1. The UE 505 may communicate with a second UE 510. The UE 510 may include some or all of the features of the UE 120 and/or the second UE 302-2.

As shown in connection with reference number 515, the UE 505 may obtain a configuration that indicates a first type of precoding and a second type of precoding. In some aspects, the UE 505 may be pre-configured with the configuration. Thus, obtaining the configuration may include accessing the configuration (e.g., from a memory associated with the UE 505). In some aspects, obtaining the configuration may include receiving the configuration. For example, the UE 505 may receive the configuration from the base station 110 (e.g., via a radio resource control (RRC) message).

In some aspects, the configuration may indicate to use the first type of precoding, or the second type of precoding, for an uplink communication, based at least in part on one or more frequency resources for a downlink communication. In some aspects, the frequency resources for the uplink communication may be allocated for use by the UE 505, and the frequency resources for the downlink communication may be allocated for use by the second UE 510. Additional details regarding the frequency resources are described in connection with FIG. 6.

In some aspects, the configuration may indicate to use the first type of precoding, or the second type of precoding, for the uplink communication, based at least in part on a distance between the frequency resources for the uplink communication (e.g., the frequency resources allocated for the uplink communication) and the frequency resources for the downlink communication (e.g., the frequency resources allocated for the downlink communication).

In some aspects, the distance may be measured in the frequency domain. For example, the configuration may indicate to use the first type of precoding if the frequency resources for the uplink communication are within a distance (e.g., in the frequency domain) from the frequency resources for the downlink communication. Alternatively, the configuration may indicate to use the second type of precoding if the frequency resources for the uplink communication are outside of the distance from the frequency resources for the downlink communication. For example, the configuration may indicate to use the first type of precoding if the frequency resources for the uplink communication are within 30 MHz of the frequency resources for the downlink communication, or to use the second type of precoding if the frequency resources for the uplink communication are 30 MHz, or more, away from the frequency resources for the downlink communication.

In some aspects, the distance may be based at least in part on one or more resource blocks, or one or more resource elements. The configuration may indicate to use the first type of precoding if the resource blocks, or resource elements, for the uplink communication are within a distance of the resource blocks, or resource elements, for the downlink communication. Alternatively, the configuration may indicate to use the second type of precoding if the resource blocks, or resource elements, for the uplink communication are outside of distance from the resource blocks, or resource elements, for the downlink communication. For example, the configuration may indicate to use the first type of precoding if the frequency resources for the uplink communication are within one hundred resource blocks of the frequency resources for the downlink communication, or to use the second type of precoding if the frequency resources for the downlink communication are at least one hundred blocks away from the frequency resources for the downlink communication.

In some aspects, the first type of precoding may be a special type of precoding, or a narrowband precoding. For example, the frequency resources for the uplink communication that are within the distance of the frequency resources for the downlink communication may need to receive a specific type of precoding, such as the narrowband precoding, since a communication using the frequency resources for the uplink communication is more likely interfere with (e.g., due to leakage) the frequency resources for the downlink communication. In contrast, the second type of precoding may be a legacy precoding, or a wideband precoding. Since a communication using the frequency resources for the uplink communication, that is not within the distance of the frequency resources for the downlink communication, are less likely to interfere with the frequency resources for the downlink communication, a wideband precoding may be sufficient to prevent interference.

In some aspects, the configuration may include an indication of a transmit precoding matrix index (TPMI) associated with the one or more frequency resources for the uplink communication. For example, a first portion of the frequency resources for the uplink communication may be associated with a first TPMI, and a second portion of the frequency resources for the uplink communication may be associated with a second TPMI. The first portion of frequency resources associated with the first TPMI may include frequency resources that are within a distance of the frequency resources for the downlink communication, and the second portion of frequency resources associated with the second TPMI may include frequency resources that are outside of the distance of the frequency resources for the downlink communication.

As shown in connection with reference number 520, the second UE 510 may transmit, and the UE 505 may receive, an indication of a downlink communication. The indication of the downlink communication may be transmitted, and received, via a sidelink communication.

As described above, the configuration may indicate to use the first type of precoding if the frequency resources for the uplink communication are within a certain distance of the frequency resources for the downlink communication, or to use the second type of precoding if the frequency resources for the uplink communication are outside of the distance of the frequency resources for the downlink communication. The first type of precoding may be a special precoding, or a narrowband precoding, to prevent leakage of the uplink communication into the frequency resources for the downlink communication. The second type of precoding may be a legacy precoding, or a wideband precoding.

In some aspects, the UE 505 may determine whether or not to use the first type of precoding based at least in part on the indication from the second UE 510 that indicates whether a downlink communication is scheduled in the one or more frequency resources for the downlink communication. For example, if there is a downlink communication scheduled in the frequency resources for the downlink communication, the UE 505 may determine to use the first type of precoding based at least in part on the frequency resources for the uplink communication being within the distance from the frequency resources for the downlink communication. However, if there is not a downlink communication scheduled in the frequency resources for the downlink communication, the UE 505 may determine to use the second type of precoding, regardless of whether the frequency resources for the uplink communication are within the distance from the frequency resources for the downlink communication. Since there is no transmission scheduled in the frequency resources for the downlink communication, the UE 505 may not need to use the first type of precoding to reduce the chances of interference with the frequency resources for the downlink communication.

As shown in connection with reference number 525, the UE 505 may determine to transmit an uplink communication having the first type of precoding or the second type of precoding.

As described above, the configuration may indicate to use the first type of precoding if the uplink communication is less than a threshold distance, or less than or equal to the threshold distance, from the one or more frequency resources for the downlink communication. Alternatively, the configuration may indicate to use the second type of precoding if the uplink communication is greater than the threshold distance, or greater than or equal to the threshold distance, from the one or more frequency resources for the downlink communication.

In some aspects, the UE 505 may determine that an uplink communication is scheduled in the frequency resources for the uplink communication that are within a distance of the frequency resources for the downlink communication. For example, the UE 505 may determine that the uplink communication is scheduled in a frequency resource that is less than one hundred resource blocks from the frequency resources for the downlink communication. Thus, the UE 505 may determine to use the first type of precoding for the uplink communication in order to reduce the likelihood of interference.

In some aspects, the UE 505 may determine that an uplink communication is scheduled in the frequency resources for the uplink communication that are outside of the distance from the frequency resources for the downlink communication. For example, the UE 505 may determine that the uplink communication is scheduled in a frequency resource that is greater than one hundred resource blocks from the frequency resources for the downlink communication. Thus, the UE 505 may determine to use the second type of precoding for the uplink communication, since the likelihood of interference is already low.

In some aspects, the UE 505 may determine whether to use the first type of precoding or the second type of precoding based at least in part on a physical distance between the UE 505 and the second UE 510. The likelihood of interference between an uplink communication by the UE 505, and a downlink communication by the second UE 510, may increase as the physical distance between the UE 505 and the second UE 510 decreases. Thus, the closer the UE 505 is to the second UE 510, the greater the likelihood of interference.

In some aspects, the UE 505 may determine that the UE 505 is within a physical distance from the second UE 510, and may determine to transmit the uplink communication having the first type of precoding. For example, the UE 505 may determine to use the first type of precoding if the UE 505 is located within ten feet of the second UE 510. In some aspects, the UE 505 may determine that the UE 505 is greater than the physical distance from the second UE 510, and may determine to transmit the uplink communication having the second type of precoding. For example, the UE 505 may determine to use the first type of precoding if the UE 505 is located greater than ten feet away from the second UE 510.

In some aspects, the UE 505 may determine whether to use the first type of precoding or the second type of precoding based at least in part on the physical distance between the UE 505 and the second UE 510, and the distance between the frequency resources for the uplink communication and the frequency resources for the downlink communication. For example, the UE 505 may determine to use the first type of precoding if the UE 505 is within a physical distance of the second UE 510, and if the frequency resources for the uplink communication are within a distance of the frequency resources for the downlink communication. Otherwise, the UE 505 may determine to use the second type of precoding. For example, the UE 505 may determine to use the second type of precoding if the UE 505 is outside of the physical distance of the second UE 510, regardless of whether the frequency resources for the uplink communication are within the distance of the frequency resources for the downlink communication. Additionally, or alternatively, the UE 505 may determine to use the second type of precoding if the frequency resources for the uplink communication are outside of the distance of the frequency resources for the downlink communication, regardless of the physical distance between the UE 505 and the second UE 510.

As shown in connection with reference number 530, the UE 505 may transmit, and the base station 110 may receive, an uplink communication having the first type of precoding or the second type of precoding.

As described above, the UE 505 may determine to use the first type of precoding or the second type of precoding based at least in part on the frequency resources for the downlink communication. For example, the UE 505 may determine to use the first type of precoding or the second type of precoding based at least in part on a distance, in the frequency domain, of the frequency resources for the uplink communication from the frequency resources for the downlink communication.

In some aspects, the UE 505 may perform a transmission of the uplink communication having the first type of precoding based at least in part on one or more frequency resources for the uplink communication being less than a threshold distance, or less than or equal to the threshold distance, from the one or more frequency resources for the downlink communication. For example, the UE 505 may transmit the uplink communication having the first type of precoding if the frequency resources for the uplink communication within one hundred resource blocks of the frequency resources for the downlink communication.

In some aspects, the UE 505 may perform a transmission of the uplink communication having the second type of precoding based at least in part on one or more frequency resources for the uplink communication being greater than a threshold distance, or greater than or equal to the threshold distance, from the one or more frequency resources for the downlink communication. For example, the UE 505 may transmit the uplink communication having the second type of precoding if the frequency resources for the uplink communication greater than hundred resource blocks away from the frequency resources for the downlink communication.

In some aspects, the UE 505 may perform the precoding. The UE 505 may perform the first type of precoding for the uplink communication based at least in part on the one or more frequency resources for the uplink communication being less than a threshold distance, or less than or equal to the threshold distance, from the one or more frequency resources for the downlink communication. Alternatively, the UE 505 may perform the second type of precoding for the uplink communication based at least in part on the one or more frequency resources for the uplink communication being greater than a threshold distance, or greater than or equal to the threshold distance, from the one or more frequency resources for the downlink communication.

In some aspects, the first type of precoding may be performed using a first precoder, and the second type of precoding may be performed using a second precoder. The first precoder and the second precoder may be different precoders. For example, the first precoder may be configured to perform special precoding, or narrowband precoding, while the second precoder may be configured to perform legacy precoding, or wideband precoding.

Although the examples in connection with FIG. 5 describe a first type of precoding and a second type of precoding, any number of types of precoding may be used. For example, the configuration may indicate that a first type of precoding should be used for an uplink communication that is less than X resource blocks away from the frequency resources for a downlink communication, a second type of precoding should be used for an uplink communication that is between X resource blocks and Y resource blocks away from the frequency resources for the downlink communication, and a third type of precoding should be used for a communication that is greater than Y resource blocks away from the frequency resources for the downlink communication. In this example, a first precoder may perform the first type of precoding, a second precoder may perform the second type of precoding, and a third precoder perform the third type of precoding.

As described above, the UE 505 may be configured to perform a first type of precoding for an uplink communication if the frequency resources for the uplink communication are within a distance of the frequency resources for a downlink communication. The frequency resources for the downlink communication may be allocated for use by a second UE. Alternatively, the UE 505 may be configured to perform a second type of precoding for the uplink communication if the frequency resources for the uplink communication are outside of the distance of the frequency resources for the downlink communication. The first type of precoding may prevent the uplink communication, from the UE 505 to the base station 110, from causing interference with a downlink communication, from the base station 110 to the second UE 510. However, the SINR of the uplink communication may be reduced in order to reduce the potential interference with the downlink communication. Alternatively, the second type of precoding may enable a greater SINR of the uplink communication. Thus, using the two types of precoding may enable an improved SINR for certain communications, while reducing the likelihood of interference with other communications.

As indicated above, FIG. 5 is provided as an example. Other examples may differ from what is described with respect to FIG. 5.

Figure 6:
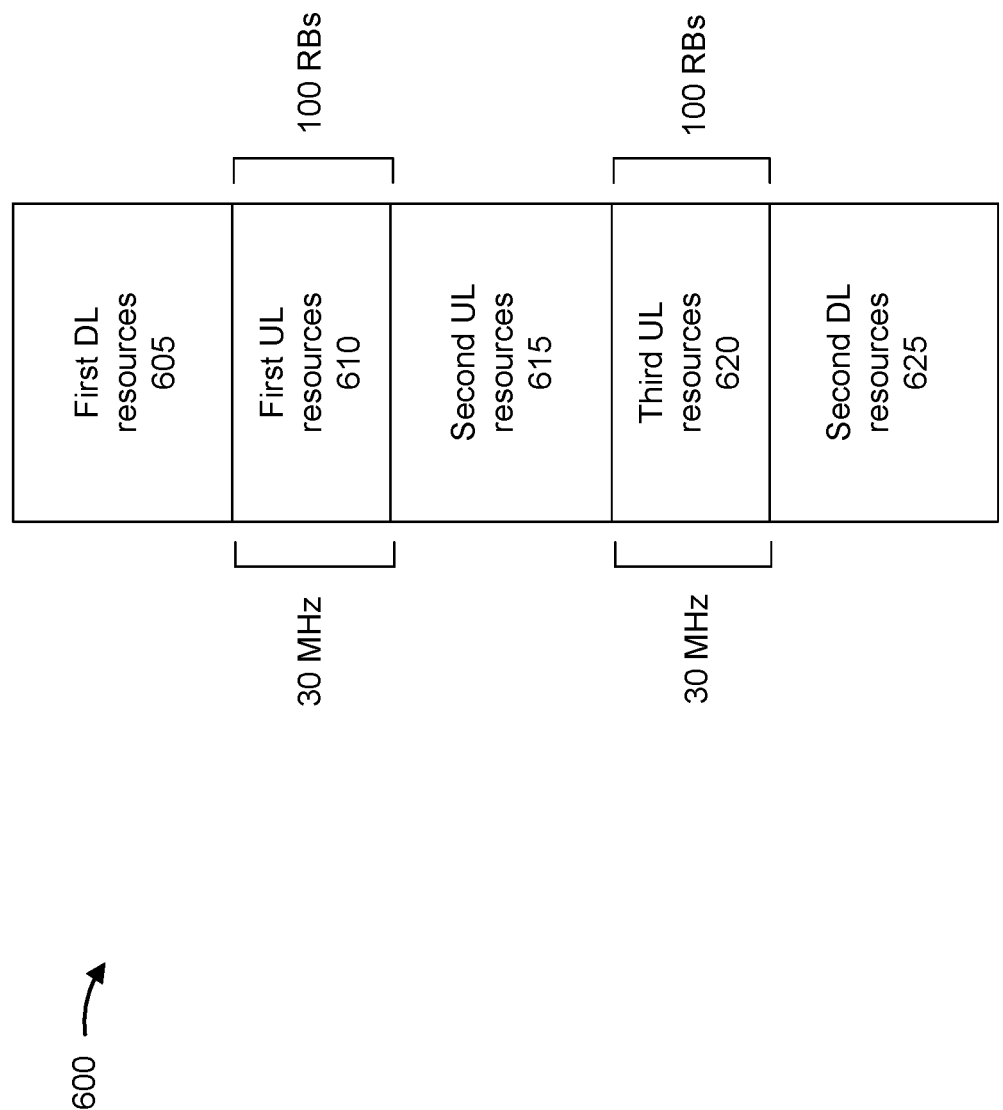
FIG. 6 is a diagram illustrating an example associated with frequency bands for sub-band precoding, in accordance with the present disclosure.

FIG. 6 is a diagram illustrating an example 600 of frequency bands for sub-band precoding, in accordance with the present disclosure. The example 600 shows first DL resources 605, first UL resources 610, second UL resources 615, third UL resources 620, and second DL resources 625. The first UL resources 610, second UL resources 615, and third UL resources 620 may be allocated for uplink transmissions by a first UE, such as the UE 505, to base station, such as the base station 110. The first DL resources 605 and the second DL resources 625 may be allocated for downlink transmissions from the base station 110 to a second UE, such as the second UE 510.

As described above, the UE 505 may receive a configuration indicating that the UE 505 should use a first type of precoding, or a second type of precoding, for an uplink communication, based at least in part on a distance between the frequency resources for the uplink communication (e.g., the frequency resources allocated for the uplink communication) and the frequency resources for the downlink communication (e.g., the frequency resources allocated for the downlink communication).

In some aspects, the indication may indicate to use the first type of precoding if the frequency resources for the uplink communication are within a distance (e.g., in the frequency domain) of the frequency resources for the downlink communication. Alternatively, the configuration may indicate to use the second type of precoding if the frequency resources for the uplink communication are outside of the distance from the frequency resources for the downlink communication. For example, the configuration may indicate to use the first type of precoding if the frequency resources for the uplink communication are within 30 MHz of the frequency resources for the downlink communication, or to use the second type of precoding if the frequency resources for the uplink communication are 30 MHz, or more, from the frequency resources for the downlink communication.

As shown in the example 600, the second UE 510 may be configured to receive a downlink communication using the first DL resources 605. The UE 505 may be configured to transmit an uplink communication using the first UL resources 610. However, the frequency resources of the first UL resources 610 may be within a distance, in the frequency domain, of the frequency resources of the first DL resources 605. For example, the first UL resources 610 may be within 30 MHz of the first DL resources 605. Thus, the UE 505 may be configured to perform a first type of precoding, a narrowband precoding, for an uplink communication using the first UL resources 610.

In some aspects, the UE 505 may be configured to transmit an uplink communication using the third UL resources 620. The third UL resources 620 may be at least 30 MHz away from the first DL resources 605. However, the third UL resources 620 may be less than 30 MHz away from the second DL resources 625. Thus, the UE 505 may be configured to perform the first type of precoding for an uplink communication using the third UL resources 620.

In some aspects, the UE 505 may be configured to transmit an uplink communication using the second UL resources 615. The second UL resources 615 may be at least 30 MHz away from the first DL resources 605 and may be at least 30 MHz away from the second DL resources 625. Thus, the UE 505 may be configured to perform a second type of precoding, such as a legacy precoding or a wideband precoding, for an uplink communication using the second UL resources 615.

In some aspects, the configuration may indicate to use the first type of precoding if the resource blocks, or resource elements, for the uplink communication are within a distance of the resource blocks, or resource elements, for the downlink communication. Alternatively, the configuration may indicate to use the second type of precoding if the resource blocks, or resource elements, for the uplink communication are outside of distance from the resource blocks, or resource elements, for the downlink communication. For example, the configuration may indicate to use the first type of precoding if the frequency resources for the uplink communication are within one hundred resource blocks of the frequency resources for the downlink communication, or to use the second type of precoding if the frequency resources for the downlink communication are at least one hundred blocks away from the frequency resources for the downlink communication.

As shown in the example 600, the second UE 510 may be configured to receive a downlink communication using the first DL resources 605. The UE 505 may be configured to transmit an uplink communication using the first UL resources 610. However, the frequency resources of the first UL resources 610 may be within a number of resource blocks of the frequency resources for of the first DL resources 605. For example, the first UL resources 610 may be within a distance of one hundred resource blocks from the first DL resources 605. Thus, the UE 505 may be configured to perform a first type of precoding, such as a narrowband precoding, for an uplink communication using the first UL resources 610.

In some aspects, the UE 505 may be configured to transmit an uplink communication using the third UL resources 620. The third UL resources 620 may be at least one hundred resource blocks away from the first DL resources 605. However, the third UL resources 620 may be less than one hundred resource blocks away from the second DL resources 625. Thus, the UE 505 may be configured to perform the first type of precoding for an uplink communication using the third UL resources 620.

In some aspects, the UE 505 may be configured to transmit an uplink communication using the second UL resources 615. The second UL resources 615 may be at least one hundred resource blocks away from the first DL resources 605 and may be at least one hundred resource blocks away from the second DL resources 625. Thus, the UE 505 may be configured to perform a second type of precoding, such as a legacy precoding or a wideband precoding, for ab uplink communication using the second UL resources 615.

As described above, the configuration may indicate to use the first type of precoding if the frequency resources for the uplink communication are within a certain distance of the frequency resources for the downlink communication, or to use the second type of precoding if the frequency resources for the uplink communication are outside of the distance of the frequency resources for the downlink communication. The first type of precoding may be a special precoding, or a narrowband precoding, to prevent leakage of the uplink communication into the frequency resources for the downlink communication. Alternatively, the second type of precoding may be a legacy precoding, or a wideband precoding.

However, the UE 505 may determine whether or not to use the first type of precoding based at least in part on receiving an indication from the second UE of whether a downlink communication is scheduled in the one or more frequency resources for the downlink communication. For example, if there is a downlink communication scheduled in the one or more frequency resources for the downlink communication, the UE 505 may determine to transmit an uplink communication having the first type of precoding, based at least in part on the frequency resources for the uplink communication being within the distance from the frequency resources for the downlink communication. However, if there is not a downlink communication scheduled in the frequency resources for the downlink communication, the UE 505 may determine to transmit the uplink communication having the second type of precoding, whether or not the frequency resources for the uplink communication are within the distance from the frequency resources for the downlink communication. Since there is no transmission scheduled in the frequency resources for the downlink communication, the UE 505 may not need to use the first type of precoding to reduce the likelihood of interference from the uplink communication.

In some aspects, the UE 605 may determine to use the second type of precoding for an uplink communication using the first UL resources 610 based at least in part on receiving an indication from the second UE 510 that there is no downlink communication scheduled in the first DL resources 605. In some aspects, the UE 605 may determine to use the second type of precoding for an uplink communication using the third UL resources 620 based at least in part on receiving an indication from the second UE 510 that there is no downlink communication scheduled in the second DL resources 625.

As indicated above, FIG. 6 is provided as an example. Other examples may differ from what is described with respect to FIG. 6.

Figure 7:
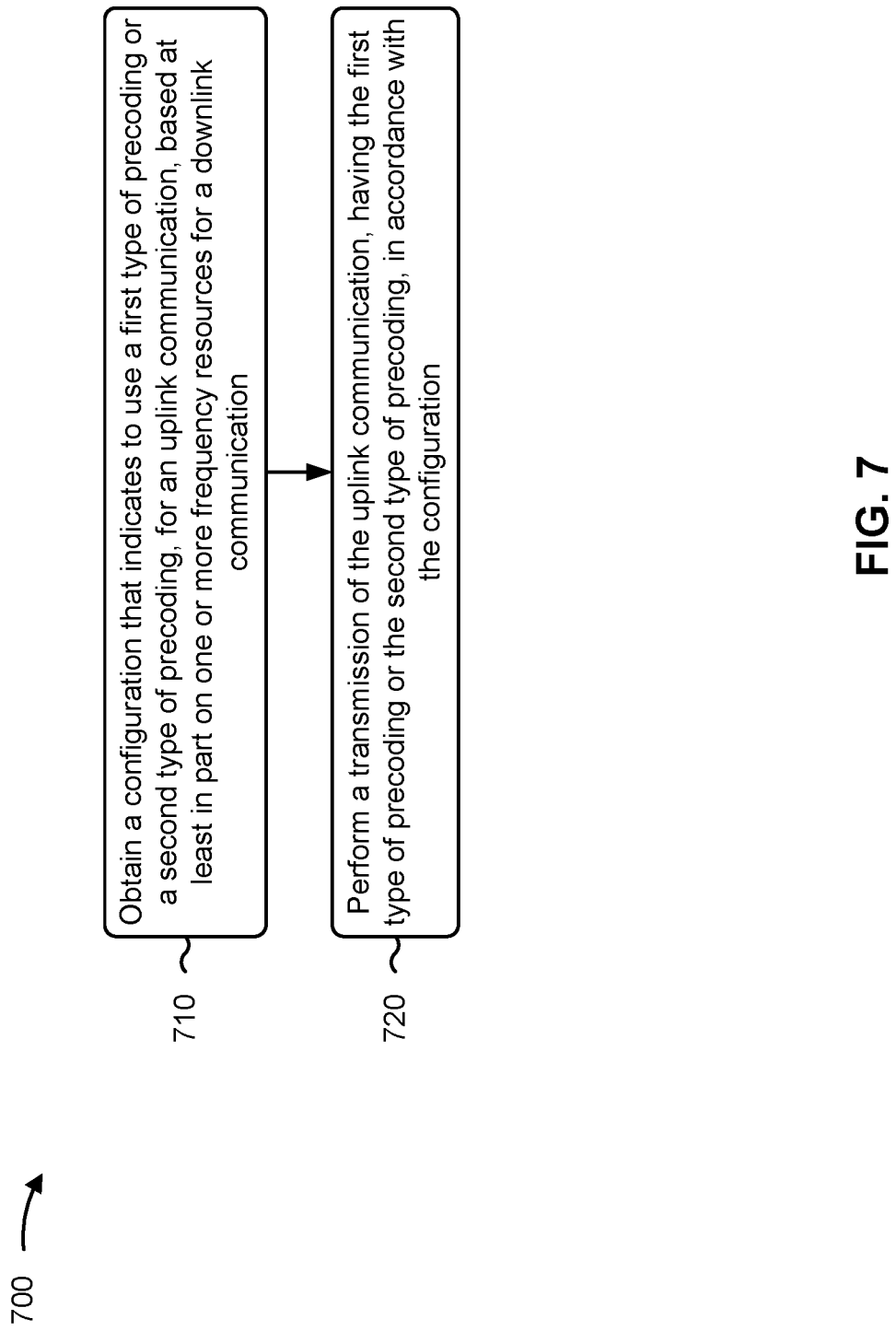
FIG. 7 is a diagram illustrating an example process associated with sub-band precoding for inter UE interference mitigation, in accordance with the present disclosure.

FIG. 7 is a diagram illustrating an example process 700 performed, for example, by a user equipment (UE), in accordance with the present disclosure. Example process 700 is an example where the UE (e.g., UE 120) performs operations associated with sub-band precoding for inter UE interference mitigation.

As shown in FIG. 7, in some aspects, process 700 may include obtaining a configuration that indicates to use a first type of precoding or a second type of precoding, for an uplink communication, based at least in part on one or more frequency resources for a downlink communication (block 710). For example, the UE (e.g., using communication manager 140 and/or obtaining component 908, depicted in FIG. 9) may obtain a configuration that indicates to use a first type of precoding or a second type of precoding, for an uplink communication, based at least in part on one or more frequency resources for a downlink communication, as described above.

As further shown in FIG. 7, in some aspects, process 700 may include performing a transmission of the uplink communication, having the first type of precoding or the second type of precoding, in accordance with the configuration (block 720). For example, the UE (e.g., using communication manager 140 and/or transmission component 904, depicted in FIG. 9) may perform a transmission of the uplink communication, having the first type of precoding or the second type of precoding, in accordance with the configuration, as described above.

Process 700 may include additional aspects, such as any single aspect or any combination of aspects described below and/or in connection with one or more other processes described elsewhere herein.

In a first aspect, the configuration indicates to use the first type of precoding or the second type of precoding, for the uplink communication, based at least in part on a distance of one or more frequency resources for the uplink communication from the one or more frequency resources for the downlink communication.

In a second aspect, alone or in combination with the first aspect, the distance is measured in a frequency domain.

In a third aspect, alone or in combination with one or more of the first and second aspects, the distance is based at least in part on one or more resource blocks, or one or more resource elements.

In a fourth aspect, alone or in combination with one or more of the first through third aspects, the configuration indicates to use the first type of precoding if the uplink communication is less than a distance, or less than or equal to the distance, from the one or more frequency resources for the downlink communication, or to use the second type of precoding if the uplink communication is greater than the distance, or greater than or equal to the distance, from the one or more frequency resources for the downlink communication.

In a fifth aspect, alone or in combination with one or more of the first through fourth aspects, performing the transmission of the uplink communication comprises performing the transmission of the uplink communication having the first type of precoding based at least in part on one or more frequency resources for the uplink communication being less than a distance, or less than or equal to the distance, from the one or more frequency resources for the downlink communication.

In a sixth aspect, alone or in combination with one or more of the first through fifth aspects, performing the transmission of the uplink communication comprises performing the transmission of the uplink communication having the second type of precoding based at least in part on one or more frequency resources for the uplink communication being greater than a distance, or greater than or equal to the distance, from the one or more frequency resources for the downlink communication.

In a seventh aspect, alone or in combination with one or more of the first through sixth aspects, first type of precoding is a narrowband precoding, and the second type of precoding is a wideband precoding.

In an eighth aspect, alone or in combination with one or more of the first through seventh aspects, the first type of precoding is performed using a first precoder associated with the UE, and the second type of precoding is performed using a second precoder associated with the UE.

In a ninth aspect, alone or in combination with one or more of the first through eighth aspects, process 700 includes performing the first type of precoding for the uplink communication, using a first precoder, or the second type of precoding for the uplink communication, using a second precoder, based at least in part on a distance of one or more frequency resources for the uplink communication from the one or more frequency resources for the downlink communication.

In a tenth aspect, alone or in combination with one or more of the first through ninth aspects, obtaining the configuration comprises receiving the configuration from a base station.

In an eleventh aspect, alone or in combination with one or more of the first through tenth aspects, receiving the configuration from the base station comprises receiving the configuration via a radio resource control message.

In a twelfth aspect, alone or in combination with one or more of the first through eleventh aspects, the configuration includes an indication of a transmit precoding matrix index associated with one or more frequency resources for the uplink communication.

In a thirteenth aspect, alone or in combination with one or more of the first through twelfth aspects, the one or more frequency resources for the downlink communication are allocated for use by a second UE.

In a fourteenth aspect, alone or in combination with one or more of the first through thirteenth aspects, process 700 includes receiving an indication from the second UE of whether a downlink communication is scheduled in the one or more frequency resources for the downlink communication.

In a fifteenth aspect, alone or in combination with one or more of the first through fourteenth aspects, performing the transmission of the communication comprises performing the transmission of the communication having the first type of precoding based at least in part on the indication from the second UE indicating that there is no downlink communication scheduled in the one or more frequency resources for the downlink communication.

In a sixteenth aspect, alone or in combination with one or more of the first through fifteenth aspects, the configuration indicates whether to use the first type of precoding or the second type of precoding based at least in part on a physical distance between the UE and a second UE.

In a seventeenth aspect, alone or in combination with one or more of the first through sixteenth aspects, performing the transmission of the communication comprises performing the transmission of the communication, having the first type of precoding or the second type of precoding, based at least in part on the physical distance between the UE and the second UE.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
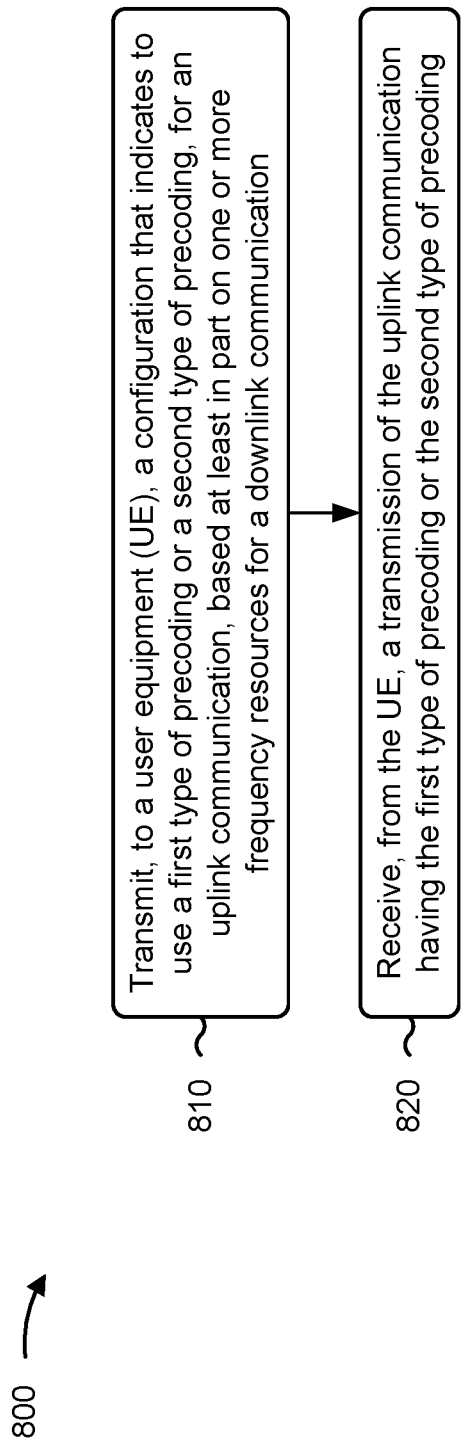
FIG. 8 is a diagram illustrating an example process associated with sub-band precoding for inter UE interference mitigation, in accordance with the present disclosure.

FIG. 8 is a diagram illustrating an example process 800 performed, for example, by a base station, in accordance with the present disclosure. Example process 800 is an example where the base station (e.g., base station 110) performs operations associated with sub-band precoding for inter UE interference mitigation.

As shown in FIG. 8, in some aspects, process 800 may include transmitting, to a UE, a configuration that indicates to use a first type of precoding or a second type of precoding, for an uplink communication, based at least in part on one or more frequency resources for a downlink communication (block 810). For example, the base station (e.g., using communication manager 150 and/or transmission component 1004, depicted in FIG. 10) may transmit, to a UE, a configuration that indicates to use a first type of precoding or a second type of precoding, for an uplink communication, based at least in part on one or more frequency resources for a downlink communication, as described above.

As further shown in FIG. 8, in some aspects, process 800 may include receiving, from the UE, a transmission of the uplink communication having the first type of precoding or the second type of precoding (block 820). For example, the base station (e.g., using communication manager 150 and/or reception component 1002, depicted in FIG. 10) may receive, from the UE, a transmission of the uplink communication having the first type of precoding or the second type of precoding, as described above.

Process 800 may include additional aspects, such as any single aspect or any combination of aspects described below and/or in connection with one or more other processes described elsewhere herein.

In a first aspect, the configuration indicates to use the first type of precoding or the second type of precoding, for the uplink communication, based at least in part on a distance of one or more frequency resources for the uplink communication from the one or more frequency resources for the downlink communication.

In a second aspect, alone or in combination with the first aspect, the distance is measured in a frequency domain.

In a third aspect, alone or in combination with one or more of the first and second aspects, the distance is based at least in part on one or more resource blocks, or one or more resource elements.

In a fourth aspect, alone or in combination with one or more of the first through third aspects, the configuration indicates to use the first type of precoding if the uplink communication is less than a distance, or less than or equal to the distance, from the one or more frequency resources for the downlink communication, or to use the second type of precoding if the uplink communication is greater than the distance, or greater than or equal to the distance, from the one or more frequency resources for the downlink communication.

In a fifth aspect, alone or in combination with one or more of the first through fourth aspects, first type of precoding is a narrowband precoding, and the second type of precoding is a wideband precoding.

In a sixth aspect, alone or in combination with one or more of the first through fifth aspects, the first type of precoding is associated with a first precoder of the UE, and the second type of precoding is associated with a second precoder of the UE.

In a seventh aspect, alone or in combination with one or more of the first through sixth aspects, transmitting the configuration comprises transmitting the configuration via a radio resource control message.

In an eighth aspect, alone or in combination with one or more of the first through seventh aspects, the configuration includes an indication of a transmit precoding matrix index associated with one or more frequency resources for the uplink communication.

In a ninth aspect, alone or in combination with one or more of the first through eighth aspects, the one or more frequency resources for the downlink communication are allocated for use by a second UE.

In a tenth aspect, alone or in combination with one or more of the first through ninth aspects, process 800 includes receiving an indication from the second UE of whether a downlink communication is scheduled in the one or more frequency resources for the downlink communication.

In an eleventh aspect, alone or in combination with one or more of the first through tenth aspects, process 800 includes transmitting, to the UE, the indication from the second UE of whether the downlink communication is scheduled in the one or more frequency resources for the downlink communication.

In a twelfth aspect, alone or in combination with one or more of the first through eleventh aspects, the configuration indicates whether to use the first type of precoding or the second type of precoding based at least in part on a physical distance between the UE and a second UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
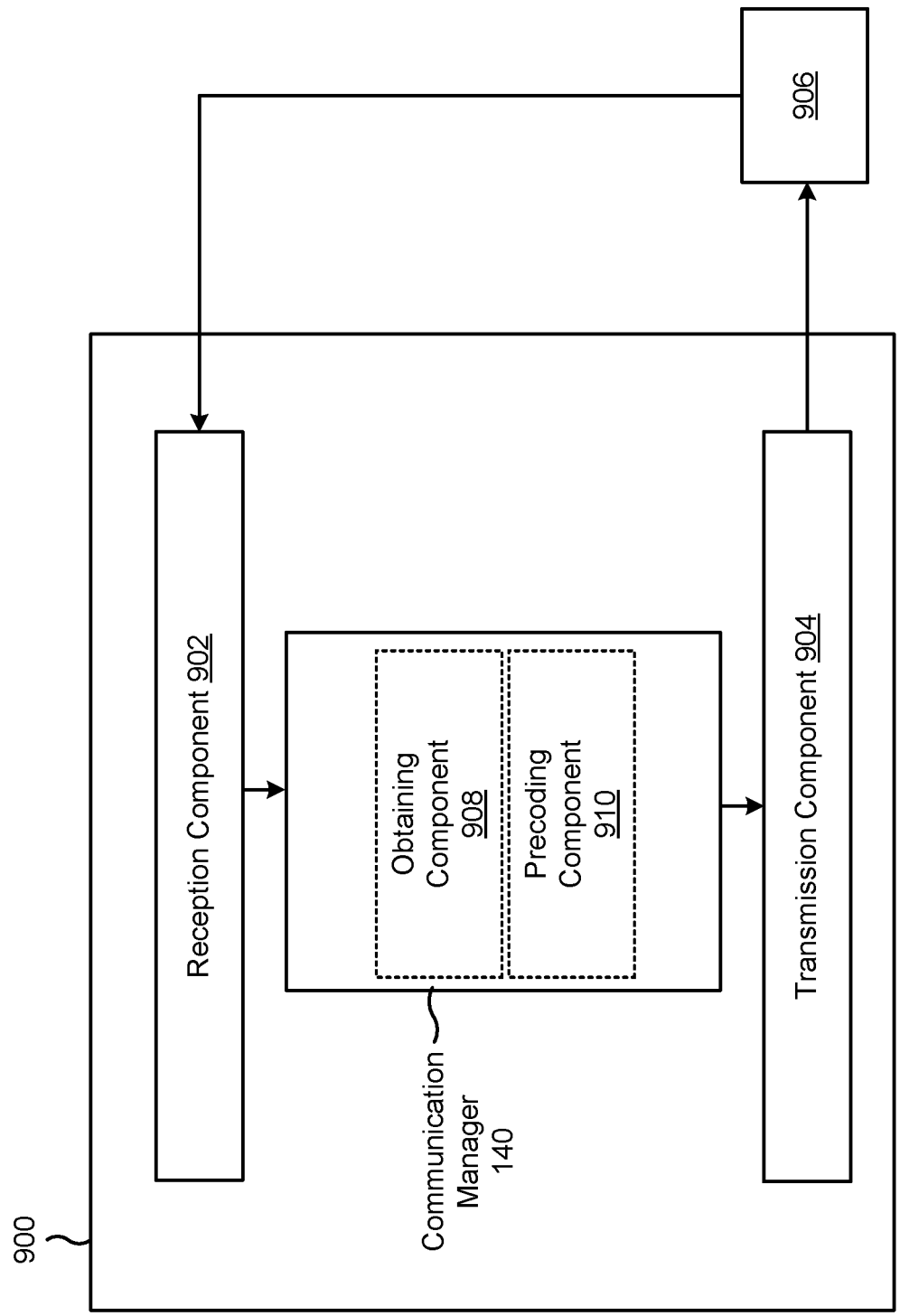
FIG. 9 is a diagram of an example apparatus for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of an obtaining component 908, or a precoding component 910, among other examples.

In some aspects, the apparatus 900 may be configured to perform one or more operations described herein in connection with FIGS. 5-6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The obtaining component 908 may obtain a configuration that indicates to use a first type of precoding or a second type of precoding, for an uplink communication, based at least in part on one or more frequency resources for a downlink communication. The transmission component 904 may perform a transmission of the uplink communication, having the first type of precoding or the second type of precoding, in accordance with the configuration.

The precoding component 910 may perform the first type of precoding for the uplink communication, using a first precoder, or the second type of precoding for the uplink communication, using a second precoder, based at least in part on a distance of one or more frequency resources for the uplink communication from the one or more frequency resources for the downlink communication.

The reception component 902 may receive an indication from the second UE of whether a downlink communication is scheduled in the one or more frequency resources for the downlink communication.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
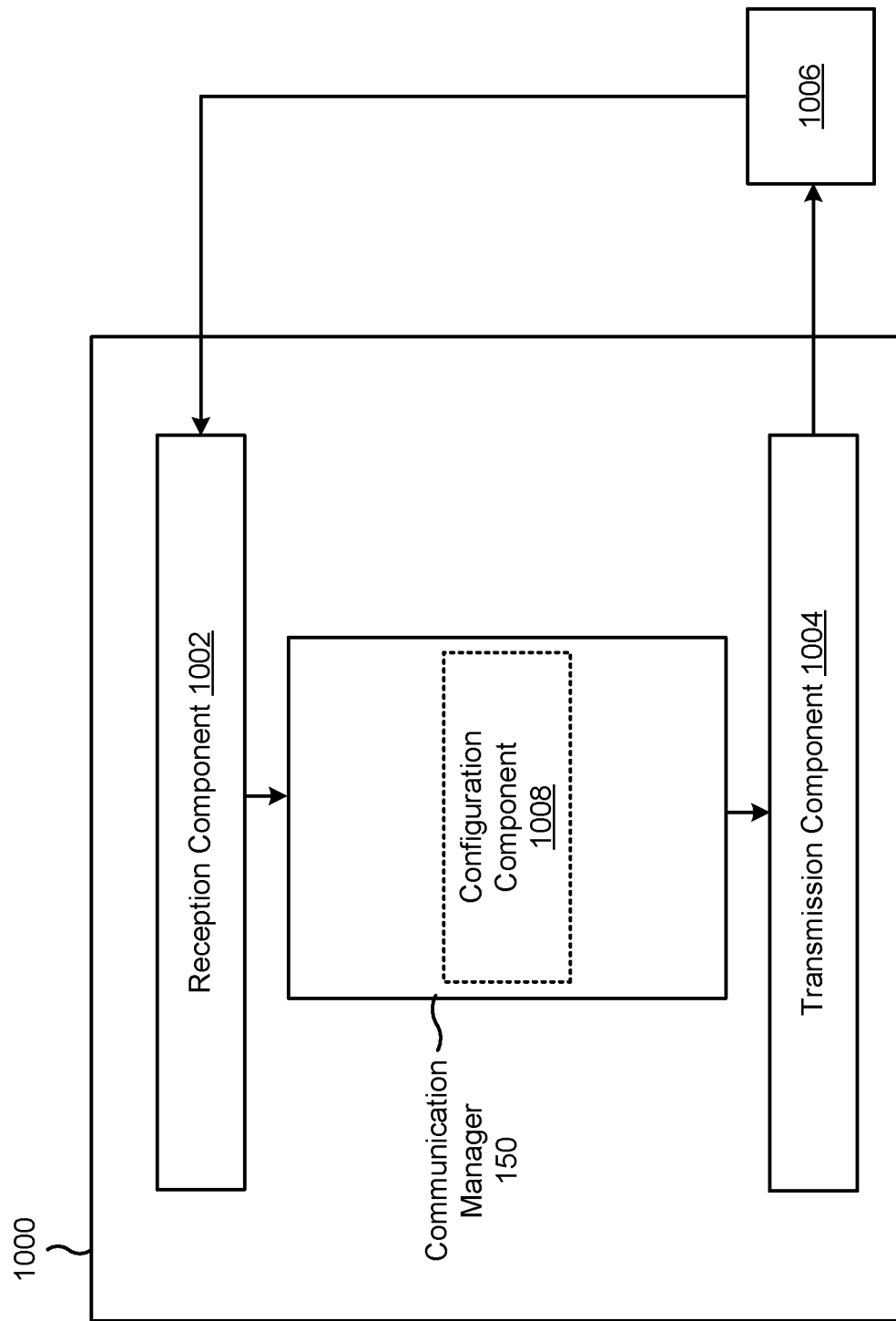
FIG. 10 is a diagram of an example apparatus for wireless communication, in accordance with the present disclosure.

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include one or more of a configuration component 1008, among other examples.

In some aspects, the apparatus 1000 may be configured to perform one or more operations described herein in connection with FIGS. 5-6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The transmission component 1004 may transmit, to a UE, a configuration that indicates to use a first type of precoding or a second type of precoding, for an uplink communication, based at least in part on one or more frequency resources for a downlink communication. The reception component 1002 may receive, from the UE, a transmission of the uplink communication having the first type of precoding or the second type of precoding.

The reception component 1002 may receive an indication from the second UE of whether a downlink communication is scheduled in the one or more frequency resources for the downlink communication.

The transmission component 1004 may transmit, to the UE, the indication from the second UE of whether the downlink communication is scheduled in the one or more frequency resources for the downlink communication.

The configuration component 1008 may generate the configuration that indicates to use the first type of precoding or the second type of precoding, for an uplink communication, based at least in part on one or more frequency resources for the downlink communication.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: obtaining a configuration that indicates to use a first type of precoding or a second type of precoding, for an uplink communication, based at least in part on one or more frequency resources for a downlink communication; and performing a transmission of the uplink communication, having the first type of precoding or the second type of precoding, in accordance with the configuration.

Aspect 2: The method of Aspect 1, wherein the configuration indicates to use the first type of precoding or the second type of precoding, for the uplink communication, based at least in part on a distance of one or more frequency resources for the uplink communication from the one or more frequency resources for the downlink communication.

Aspect 3: The method of Aspect 2, wherein the distance is measured in a frequency domain.

Aspect 4: The method of Aspect 2, wherein the distance is based at least in part on one or more resource blocks, or one or more resource elements.

Aspect 5: The method of any of Aspects 1-4, wherein the configuration indicates to use the first type of precoding if the uplink communication is less than a distance, or less than or equal to the distance, from the one or more frequency resources for the downlink communication, or to use the second type of precoding if the uplink communication is greater than the distance, or greater than or equal to the distance, from the one or more frequency resources for the downlink communication.

Aspect 6: The method of any of Aspects 1-5, wherein performing the transmission of the uplink communication comprises performing the transmission of the uplink communication having the first type of precoding based at least in part on one or more frequency resources for the uplink communication being less than a distance, or less than or equal to the distance, from the one or more frequency resources for the downlink communication.

Aspect 7: The method of any of Aspects 1-5, wherein performing the transmission of the uplink communication comprises performing the transmission of the uplink communication having the second type of precoding based at least in part on one or more frequency resources for the uplink communication being greater than a distance, or greater than or equal to the distance, from the one or more frequency resources for the downlink communication.

Aspect 8: The method of any of Aspects 1-7, wherein first type of precoding is a narrowband precoding, and the second type of precoding is a wideband precoding.

Aspect 9: The method of any of Aspects 1-8, wherein the first type of precoding is performed using a first precoder associated with the UE, and the second type of precoding is performed using a second precoder associated with the UE.

Aspect 10: The method of any of Aspects 1-9, further comprising performing the first type of precoding for the uplink communication, using a first precoder, or the second type of precoding for the uplink communication, using a second precoder, based at least in part on a distance of one or more frequency resources for the uplink communication from the one or more frequency resources for the downlink communication.

Aspect 11: The method of any of Aspects 1-10, wherein obtaining the configuration comprises receiving the configuration from a base station.

Aspect 12: The method of Aspect 11, wherein receiving the configuration from the base station comprises receiving the configuration via a radio resource control message.

Aspect 13: The method of Aspect 1, wherein the configuration includes an indication of a transmit precoding matrix index associated with one or more frequency resources for the uplink communication.

Aspect 14: The method of any of Aspects 1-13, wherein the one or more frequency resources for the downlink communication are allocated for use by a second UE.

Aspect 15: The method of Aspect 14, further comprising receiving an indication from the second UE of whether a downlink communication is scheduled in the one or more frequency resources for the downlink communication.

Aspect 16: The method of Aspect 15, wherein performing the transmission of the communication comprises performing the transmission of the communication having the first type of precoding based at least in part on the indication from the second UE indicating that there is no downlink communication scheduled in the one or more frequency resources for the downlink communication.

Aspect 17: The method of any of Aspects 1-16, wherein the configuration indicates whether to use the first type of precoding or the second type of precoding based at least in part on a physical distance between the UE and a second UE.

Aspect 18: The method of Aspect 17, wherein performing the transmission of the communication comprises performing the transmission of the communication, having the first type of precoding or the second type of precoding, based at least in part on the physical distance between the UE and the second UE.

Aspect 19: A method of wireless communication performed by a base station, comprising: transmitting, to a user equipment (UE), a configuration that indicates to use a first type of precoding or a second type of precoding, for an uplink communication, based at least in part on one or more frequency resources for a downlink communication; and receiving, from the UE, a transmission of the uplink communication having the first type of precoding or the second type of precoding.

Aspect 20: The method of Aspect 19, wherein the configuration indicates to use the first type of precoding or the second type of precoding, for the uplink communication, based at least in part on a distance of one or more frequency resources for the uplink communication from the one or more frequency resources for the downlink communication.

Aspect 21: The method of Aspect 20, wherein the distance is measured in a frequency domain.

Aspect 22: The method of Aspect 20, wherein the distance is based at least in part on one or more resource blocks, or one or more resource elements.

Aspect 23: The method of any of Aspects 19-22, wherein the configuration indicates to use the first type of precoding if the uplink communication is less than a distance, or less than or equal to the distance, from the one or more frequency resources for the downlink communication, or to use the second type of precoding if the uplink communication is greater than the distance, or greater than or equal to the distance, from the one or more frequency resources for the downlink communication.

Aspect 24: The method of any of Aspects 19-23, wherein first type of precoding is a narrowband precoding, and the second type of precoding is a wideband precoding.

Aspect 25: The method of any of Aspects 19-24, wherein the first type of precoding is associated with a first precoder of the UE, and the second type of precoding is associated with a second precoder of the UE.

Aspect 26: The method of any of Aspects 19-25, wherein transmitting the configuration comprises transmitting the configuration via a radio resource control message.

Aspect 27: The method of any of Aspects 19-26, wherein the configuration includes an indication of a transmit precoding matrix index associated with one or more frequency resources for the uplink communication.

Aspect 28: The method of any of Aspects 19-27, wherein the one or more frequency resources for the downlink communication are allocated for use by a second UE.

Aspect 29: The method of Aspect 28, further comprising receiving an indication from the second UE of whether a downlink communication is scheduled in the one or more frequency resources for the downlink communication.

Aspect 30: The method of Aspect 29, further comprising transmitting, to the UE, the indication from the second UE of whether the downlink communication is scheduled in the one or more frequency resources for the downlink communication.

Aspect 31: The method of any of Aspects 19-30, wherein the configuration indicates whether to use the first type of precoding or the second type of precoding based at least in part on a physical distance between the UE and a second UE.

Aspect 32: An apparatus for wireless communication at a device, comprising a processor; memory coupled with the processor; and instructions stored in the memory and executable by the processor to cause the apparatus to perform the method of one or more of Aspects 1-18.

Aspect 33: A device for wireless communication, comprising a memory and one or more processors coupled to the memory, the one or more processors configured to perform the method of one or more of Aspects 1-18.

Aspect 34: An apparatus for wireless communication, comprising at least one means for performing the method of one or more of Aspects 1-18.

Aspect 35: A non-transitory computer-readable medium storing code for wireless communication, the code comprising instructions executable by a processor to perform the method of one or more of Aspects 1-18.

Aspect 36: A non-transitory computer-readable medium storing a set of instructions for wireless communication, the set of instructions comprising one or more instructions that, when executed by one or more processors of a device, cause the device to perform the method of one or more of Aspects 1-18.

Aspect 37: An apparatus for wireless communication at a device, comprising a processor; memory coupled with the processor; and instructions stored in the memory and executable by the processor to cause the apparatus to perform the method of one or more of Aspects 19-31.

Aspect 38: A device for wireless communication, comprising a memory and one or more processors coupled to the memory, the one or more processors configured to perform the method of one or more of Aspects 19-31.

Aspect 39: An apparatus for wireless communication, comprising at least one means for performing the method of one or more of Aspects 19-31.

Aspect 40: A non-transitory computer-readable medium storing code for wireless communication, the code comprising instructions executable by a processor to perform the method of one or more of Aspects 19-31.

Aspect 41: A non-transitory computer-readable medium storing a set of instructions for wireless communication, the set of instructions comprising one or more instructions that, when executed by one or more processors of a device, cause the device to perform the method of one or more of Aspects 19-31.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   a memory; and
   one or more processors, coupled to the memory, configured to:
   obtain a configuration that indicates to use a first type of precoding or a second type of precoding, for an uplink communication, based at least in part on one or more frequency resources for a downlink communication; and
   perform a transmission of the uplink communication, having the first type of precoding or the second type of precoding, in accordance with the configuration;
   wherein the configuration indicates to use the first type of precoding or the second type of precoding, for the uplink communication, based at least in part on a distance of one or more frequency resources for the uplink communication from the one or more frequency resources for the downlink communication.

2. The apparatus of claim 1, wherein the distance is measured in a frequency domain.

3. The apparatus of claim 1, wherein the distance is based at least in part on one or more resource blocks, or one or more resource elements.

4. The apparatus of claim 1, wherein the first type of precoding is performed using a first precoder associated with the UE, and the second type of precoding is performed using a second precoder associated with the UE.

5. The apparatus of claim 1, wherein the one or more processors, to obtain the configuration, are configured to receive the configuration from a base station.

6. The apparatus of claim 1, wherein the one or more frequency resources for the downlink communication are allocated for use by a second UE.

7. An apparatus for wireless communication at a user equipment (UE), comprising:
   a memory; and
   one or more processors, coupled to the memory, configured to:
   obtain a configuration that indicates to use a first type of precoding or a second type of precoding, for an uplink communication, based at least in part on one or more frequency resources for a downlink communication; and
   perform a transmission of the uplink communication, having the first type of precoding or the second type of precoding, in accordance with the configuration;
   wherein the configuration indicates to use the first type of precoding if the uplink communication is less than a distance, or less than or equal to the distance, from the one or more frequency resources for the downlink communication, or to use the second type of precoding if the uplink communication is greater than the distance, or greater than or equal to the distance, from the one or more frequency resources for the downlink communication.

8. An apparatus for wireless communication at a user equipment (UE), comprising:
   a memory; and
   one or more processors, coupled to the memory, configured to:
   obtain a configuration that indicates to use a first type of precoding or a second type of precoding, for an uplink communication, based at least in part on one or more frequency resources for a downlink communication; and
   perform a transmission of the uplink communication, having the first type of precoding or the second type of precoding, in accordance with the configuration;
   wherein the one or more processors are configured to perform the transmission of the uplink communication having the first type of precoding based at least in part on one or more frequency resources for the uplink communication being less than a distance, or less than or equal to the distance, from the one or more frequency resources for the downlink communication.

9. An apparatus for wireless communication at a user equipment (UE), comprising:
   a memory; and
   one or more processors, coupled to the memory, configured to:
   obtain a configuration that indicates to use a first type of precoding or a second type of precoding, for an uplink communication, based at least in part on one or more frequency resources for a downlink communication; and
   perform a transmission of the uplink communication, having the first type of precoding or the second type of precoding, in accordance with the configuration;
   wherein the one or more processors are configured to perform the transmission of the uplink communication having the second type of precoding based at least in part on one or more frequency resources for the uplink communication being greater than a distance, or greater than or equal to the distance, from the one or more frequency resources for the downlink communication.

10. An apparatus for wireless communication at a user equipment (UE), comprising:
a memory; and
one or more processors, coupled to the memory, configured to:
obtain a configuration that indicates to use a first type of precoding or a second type of precoding, for an uplink communication, based at least in part on one or more frequency resources for a downlink communication; and
perform a transmission of the uplink communication, having the first type of precoding or the second type of precoding, in accordance with the configuration;
wherein the one or more frequency resources for the downlink communication are allocated for use by a second UE; and
wherein the one or more processors are further configured to receive an indication from the second UE of whether a downlink communication is scheduled in the one or more frequency resources for the downlink communication.

11. The apparatus of claim 10, wherein the one or more processors are configured to perform the transmission of the communication having the first type of precoding based at least in part on the indication from the second UE indicating that there is no downlink communication scheduled in the one or more frequency resources for the downlink communication.

12. An apparatus for wireless communication at a user equipment (UE), comprising:
a memory; and
one or more processors, coupled to the memory, configured to:
obtain a configuration that indicates to use a first type of precoding or a second type of precoding, for an uplink communication, based at least in part on one or more frequency resources for a downlink communication; and
perform a transmission of the uplink communication, having the first type of precoding or the second type of precoding, in accordance with the configuration;
wherein the configuration indicates whether to use the first type of precoding or the second type of precoding based at least in part on a physical distance between the UE and a second UE.

13. An apparatus for wireless communication at a base station, comprising:
a memory; and
one or more processors, coupled to the memory, configured to:
transmit, to a user equipment (UE), a configuration that indicates to use a first type of precoding or a second type of precoding, for an uplink communication, based at least in part on one or more frequency resources for a downlink communication; and
receive, from the UE, a transmission of the uplink communication having the first type of precoding or the second type of precoding;
wherein the configuration indicates to use the first type of precoding or the second type of precoding, for the uplink communication, based at least in part on a distance of one or more frequency resources for the uplink communication from the one or more frequency resources for the downlink communication.

14. The apparatus of claim 13, wherein the distance is measured in a frequency domain.

15. The apparatus of claim 13, wherein the distance is based at least in part on one or more resource blocks, or one or more resource elements.

16. The apparatus of claim 13, wherein the first type of precoding is associated with a first precoder of the UE, and the second type of precoding is associated with a second precoder of the UE.

17. The apparatus of claim 13, wherein the one or more frequency resources for the downlink communication are allocated for use by a second UE.

18. An apparatus for wireless communication at a base station, comprising:
a memory; and
one or more processors, coupled to the memory, configured to:
transmit, to a user equipment (UE), a configuration that indicates to use a first type of precoding or a second type of precoding, for an uplink communication, based at least in part on one or more frequency resources for a downlink communication; and
receive, from the UE, a transmission of the uplink communication having the first type of precoding or the second type of precoding;
wherein the one or more processors are further configured to receive an indication from the second UE of whether a downlink communication is scheduled in the one or more frequency resources for the downlink communication.

19. The apparatus of claim 18, wherein the one or more processors are further configured to transmit, to the UE, the indication from the second UE of whether the downlink communication is scheduled in the one or more frequency resources for the downlink communication.

20. An apparatus for wireless communication at a base station, comprising:
a memory; and
one or more processors, coupled to the memory, configured to:
transmit, to a user equipment (UE), a configuration that indicates to use a first type of precoding or a second type of precoding, for an uplink communication, based at least in part on one or more frequency resources for a downlink communication; and
receive, from the UE, a transmission of the uplink communication having the first type of precoding or the second type of precoding;
wherein the configuration indicates whether to use the first type of precoding or the second type of precoding based at least in part on a physical distance between the UE and a second UE.

21. A method of wireless communication performed by a user equipment (UE), comprising:
obtaining a configuration that indicates to use a first type of precoding or a second type of precoding, for an uplink communication, based at least in part on one or more frequency resources for a downlink communication; and
performing a transmission of the uplink communication, having the first type of precoding or the second type of precoding, in accordance with the configuration;
wherein the configuration indicates to use the first type of precoding or the second type of precoding, for the uplink communication, based at least in part on a distance of one or more frequency resources for the uplink communication from the one or more frequency resources for the downlink communication.

22. The method of claim 21, wherein the first type of precoding is performed using a first precoder associated with the UE, and the second type of precoding is performed using a second precoder associated with the UE.

23. The method of claim 21, wherein the one or more frequency resources for the downlink communication are allocated for use by a second UE.

24. A method of wireless communication performed by a base station, comprising:
 transmitting, to a user equipment (UE), a configuration that indicates to use a first type of precoding or a second type of precoding, for an uplink communication, based at least in part on one or more frequency resources for a downlink communication; and
 receiving, from the UE, a transmission of the uplink communication having the first type of precoding or the second type of precoding;
 wherein the configuration indicates to use the first type of precoding or the second type of precoding, for the uplink communication, based at least in part on a distance of one or more frequency resources for the uplink communication from the one or more frequency resources for the downlink communication.

25. The method of claim 24, wherein the first type of precoding is associated with a first precoder of the UE, and the second type of precoding is associated with a second precoder of the UE.

26. The method of claim 24, wherein the one or more frequency resources for the downlink communication are allocated for use by a second UE.

* * * * *